(12) United States Patent
Li et al.

(10) Patent No.: US 12,375,216 B2
(45) Date of Patent: Jul. 29, 2025

(54) HARQ-ACK FEEDBACK MODE DETERMINING METHOD, HARQ-ACK FEEDBACK MODE CONFIGURATION METHOD, AND DEVICE

(71) Applicant: VIVO MOBILE COMMUNICATION CO., LTD., Dongguan (CN)

(72) Inventors: Na Li, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 345 days.

(21) Appl. No.: 17/955,522

(22) Filed: Sep. 28, 2022

(65) Prior Publication Data
US 2023/0016851 A1    Jan. 19, 2023

Related U.S. Application Data (63) Continuation of application No. PCT/CN2021/082286, filed on Mar. 23, 2021.

(30) Foreign Application Priority Data

Mar. 30, 2020   (CN) .......................... 202010239693.5

(51) Int. Cl.
*H04L 1/1825* (2023.01)
*H04L 5/00* (2006.01)
*H04W 72/23* (2023.01)

(52) U.S. Cl.
CPC .......... *H04L 1/1825* (2013.01); *H04L 5/0055* (2013.01); *H04W 72/23* (2023.01)

(58) Field of Classification Search
CPC ... H04L 1/1825; H04L 5/0055; H04L 1/1822; H04L 1/1854; H04L 1/1864; H04L 1/1812; H04W 72/23
See application file for complete search history.

(56) References Cited

U.S. PATENT DOCUMENTS

| 11,824,665 B2* | 11/2023 | Lee ...................... H04L 1/1854 |
| 2021/0021383 A1* | 1/2021 | Chen .................... H04L 1/1861 |

(Continued)

FOREIGN PATENT DOCUMENTS

| CN | 103326806 A | 9/2013 |
| CN | 108023687 A | 5/2018 |

(Continued)

OTHER PUBLICATIONS

International Search Report issued in corresponding International Application No. PCT/CN2021/082286, mailed May 26, 2021, 6 pages.

(Continued)

*Primary Examiner* — Abdullahi Ahmed
(74) *Attorney, Agent, or Firm* — IPX PLLC (57) ABSTRACT

A HARQ-ACK feedback mode determining method, a HARQ-ACK feedback mode configuration method, and a device are disclosed. The method includes: determining, according to a service type corresponding to a PDSCH, a HARQ-ACK feedback mode corresponding to the PDSCH; determining, according to a radio network temporary identifier RNTI of a PDSCH, a HARQ-ACK feedback mode corresponding to the PDSCH; or determining, according to downlink control information DCI for scheduling a PDSCH, a HARQ-ACK feedback mode corresponding to the PDSCH.

17 Claims, 5 Drawing Sheets

(56) References Cited

U.S. PATENT DOCUMENTS

| | | | |
|---|---|---|---|
| 2022/0046684 A1* | 2/2022 | Rico Alvarino | H04L 1/1861 |
| 2022/0052793 A1* | 2/2022 | Bao | H04L 1/1812 |
| 2022/0201528 A1* | 6/2022 | Shin | H04L 5/0057 |
| 2023/0029658 A1* | 2/2023 | Takeda | H04L 5/0051 |
| 2023/0144815 A1* | 5/2023 | Li | H04L 1/1854 |
| | | | 370/328 |
| 2024/0243857 A1* | 7/2024 | Lei | H04L 1/1896 |
| 2024/0267917 A1* | 8/2024 | Li | H04W 4/06 |

FOREIGN PATENT DOCUMENTS

| | | |
|---|---|---|
| CN | 108604958 A | 9/2018 |
| CN | 109891802 A | 6/2019 |
| CN | 110166206 A | 8/2019 |
| CN | 111447686 A | 7/2020 |
| EP | 3282725 A1 | 2/2018 |

OTHER PUBLICATIONS

LG Electronics, "Discussion on multiple transport blocks scheduling in MTC", 3GPP TSG RAN WG1 Meeting #95 R1-1812529, Nov. 2018.

LG Electronics, "Discussion on multiple transmission blocks scheduling in MTC", 3GPP TSG RAN WG1 Meeting #94 R1-1808467, Aug. 2018.

Qualcomm Incorporated, "Views on reliability enhancement for Multicast RRC_Connected UEs", 3GPP TSG RAN WG1 #104 R1-2101488, Jan. 2021.

Qualcomm Incorporated, "Physical layer procedures for sidelink", 3GPP TSG RAN WG1 Meeting #97 R1-1907274, May 4, 2019.

Fist Office Action issued in related Chinese Application No. 202010239693.5, mailed Feb. 28, 2022, 8 pages.

Nokia, Nokia Shanghai Bell, "IIoT WI: Resource conflicts between UL grants, HARQ-ACK Enhancements for SPS and TSN time synchronization", 3GPP TSG RAN WG1 Meeting #98bis, R1-1910870, Oct. 2019.

LG Electronics, "Discussion on multiple transport blocks scheduling in MTC", 3GPP TSG RAN WG1 Meeting #95 R1-1812527, Nov. 2018.

* cited by examiner

HARQ-ACK FEEDBACK MODE DETERMINING METHOD, HARQ-ACK FEEDBACK MODE CONFIGURATION METHOD, AND DEVICE

CROSS-REFERENCE TO RELATED APPLICATIONS

This application is a continuation of International Application No. PCT/CN2021/082286, filed on Mar. 23, 2021, which claims priority to Chinese Patent Application No. 202010239693.5, filed on Mar. 30, 2020. The entire contents of each of the above-identified applications are expressly incorporated herein by reference.

TECHNICAL FIELD

The present disclosure relates to the field of communication technologies, and in particular, to a HARQ-ACK feedback mode determining method, a HARQ-ACK feedback mode configuration method, and a device.

BACKGROUND

In Long Term Evolution (LTE) broadcast/multicast transmission, sending of a Multimedia Broadcast/Multicast Service (MBMS) in a Multicast Broadcast Single Frequency Network (MBSFN) mode and sending of a multicast service in a Single Cell-Point To Multipoint (SC-PTM) transmission mode are supported. In the MBSFN mode, cells in a same MBSFN region synchronously send a same broadcast service, which facilitates reception of a terminal. Control information (a control channel parameter, a traffic channel parameter, scheduling information, or the like) and data information of the MBMS service are both sent in a broadcast mode, so that both a terminal in an idle state and a terminal in a connected state can receive the MBMS service. Besides, the data information of the MBMS is only sent in an MBSFN subframe. SC-PTM is another multicast sending mode after the MBMS service. The biggest difference from the MBSFN mode is that a group-Radio Network Temporary Identifier (g-RNTI) is only scheduled or sent in a single cell for service scheduling. A control channel parameter, a service identifier, period information, or the like is broadcast in a broadcast message. Scheduling information is notified by a Physical Downlink Control CHannel (PDCCH) scrambled by the g-RNTI. Data is sent in a multicast mode. This is equivalent to that a terminal that is interested monitors the g-RNTI to learn of data scheduling and then performs reception.

In LTE, a terminal can receive multiple broadcast/multicast services at the same time. In the MBSFN mode, different services have different MBSFN configurations. Terminals can distinguish different services based on MBSFN. In the SC-PTM, different services use different g-RNTIs, and the terminal can distinguish different services based on the g-RNTIs.

In the prior art, none of Physical Downlink Shared CHannel (PDSCH) multicast supports HARQ-ACK feedback. However, HARQ-ACK feedback can improve the reliability and system efficiency of broadcast/multicast services, and the reliability requirements of services are also different. That is, some services require HARQ-ACK, and the other services may not require HARQ-ACK feedback, and the accuracy of HARQ-ACK information for different services is also different. Therefore, the existing HARQ-ACK mechanism cannot implement HARQ-ACK feedback for PDSCH multicast or broadcast.

SUMMARY

Embodiments of the present disclosure provide a HARQ-ACK feedback mode determining method, a HARQ-ACK feedback mode configuration method, and a device.

The embodiments of the present disclosure are implemented as follows: a Hybrid Automatic Repeat reQuest ACKnowledgment (HARQ-ACK) feedback mode determining method, applied to a communication device and including:
  determining, according to a service type corresponding to a Physical Downlink Shared CHannel (PDSCH), a HARQ-ACK feedback mode corresponding to the PDSCH;
  or
  determining, according to a Radio Network Temporary Identifier (RNTI) of a PDSCH, a HARQ-ACK feedback mode corresponding to the PDSCH;
  or
  determining, according to Downlink Control Information (DCI) for scheduling a PDSCH, a HARQ-ACK feedback mode corresponding to the PDSCH.

The embodiments of the present disclosure also provide a HARQ-ACK feedback mode configuration method, applied to network side device and including
  configuring a corresponding HARQ-ACK feedback mode for a PDSCH corresponding to each service type;
  or
  configuring a corresponding HARQ-ACK feedback mode for each RNTI scrambling a PDSCH;
  or
  indicating a HARQ-ACK feedback mode of a PDSCH by DCI for scheduling the PDSCH.

The embodiments of the present disclosure also provide a communication device, including:
  a determining module, configured to determine, according to a service type corresponding to a PDSCH, a HARQ-ACK feedback mode corresponding to the PDSCH;
  or configured to determine, according to a RNTI of a PDSCH, a HARQ-ACK feedback mode corresponding to the PDSCH;
  or configured to determine, according to DCI for scheduling a PDSCH, a HARQ-ACK feedback mode corresponding to the PDSCH.

The embodiments of the present disclosure further provide a communication device, including a processor, a memory, and a computer program stored in the memory and executable on the processor. The computer program, when executed by the processor, implements the steps of the foregoing HARQ-ACK feedback mode determining method.

The embodiments of the present disclosure further provide a network side device, including:
  a configuration module, configured to configure a corresponding HARQ-ACK feedback mode for a PDSCH corresponding to each service type;
  or configured to configure a corresponding HARQ-ACK feedback mode for each RNTI scrambling a PDSCH;
  or configured to indicate a HARQ-ACK feedback mode of a PDSCH by DCI for scheduling the PDSCH.

The embodiments of the present disclosure further provide a network side device, including a processor, a memory, and a computer program stored in the memory and executable on the processor. The computer program, when executed by the processor, implements the steps of the foregoing HARQ-ACK feedback mode configuration method.

The embodiments of the present disclosure further provide a computer readable storage medium. The computer readable storage medium stores a computer program. The computer program, when executed by a processor, implements the steps of the foregoing HARQ-ACK feedback mode determining method. In some embodiments, the computer program, when executed by the processor, implements the steps of the foregoing HARQ-ACK feedback mode configuration method.

The embodiments of the present disclosure further provide a chip, including a processor and a communication interface. The communication interface is coupled to the processor, and the processor is configured to run a program or an instruction to implement steps of the foregoing HARQ-ACK feedback mode determining method.

The embodiments of the present disclosure further provide a computer program product. The computer program product is executed by a processor to implement steps of the foregoing HARQ-ACK feedback mode determining method, and a same technical effect can be achieved. To avoid repetition, details are not described herein again.

The embodiments of the present disclosure further provide a control apparatus, configured to implement steps of the foregoing HARQ-ACK feedback mode determining method, and a same technical effect can be achieved. To avoid repetition, details are not described herein again. In the embodiments of the present disclosure, the network side device configures the corresponding HARQ-ACK feedback mode for each service type or each RNTI scrambling a PDSCH, or the network side device indicates the HARQ-ACK feedback mode of the PDSCH through DCI, so that different services with different requirements are configured with different HARQ-ACK feedback modes, which saves HARQ-ACK feedback resources.

BRIEF DESCRIPTION OF DRAWINGS

The following describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

The communication device mentioned in the embodiments of the present disclosure may be a terminal or a network side device, that is, both the terminal and/or the network side device can execute the HARQ-ACK feedback mode determining method provided by the embodiments of the present disclosure.

The terminal provided in the embodiments of the present disclosure may be a mobile phone, a tablet computer, a notebook computer, an Ultra-Mobile Personal Computer (UMPC), a netbook, a wearable device, a vehicle-mounted device, a Personal Digital Assistant (PDA), or the like. It should be noted that a specific type of the terminal is not limited in this embodiment of the present disclosure. The network side device may be a base station. The base station may be a commonly used base station, or may be an evolved nodeB (evolved node base station, eNB), or may be a device such as a network side device (for example, a next generation nodeB (next generation node base station, gNB) or a Transmission and Reception Point (TRP)) in a 5G system, or a cell.

Figure 1:
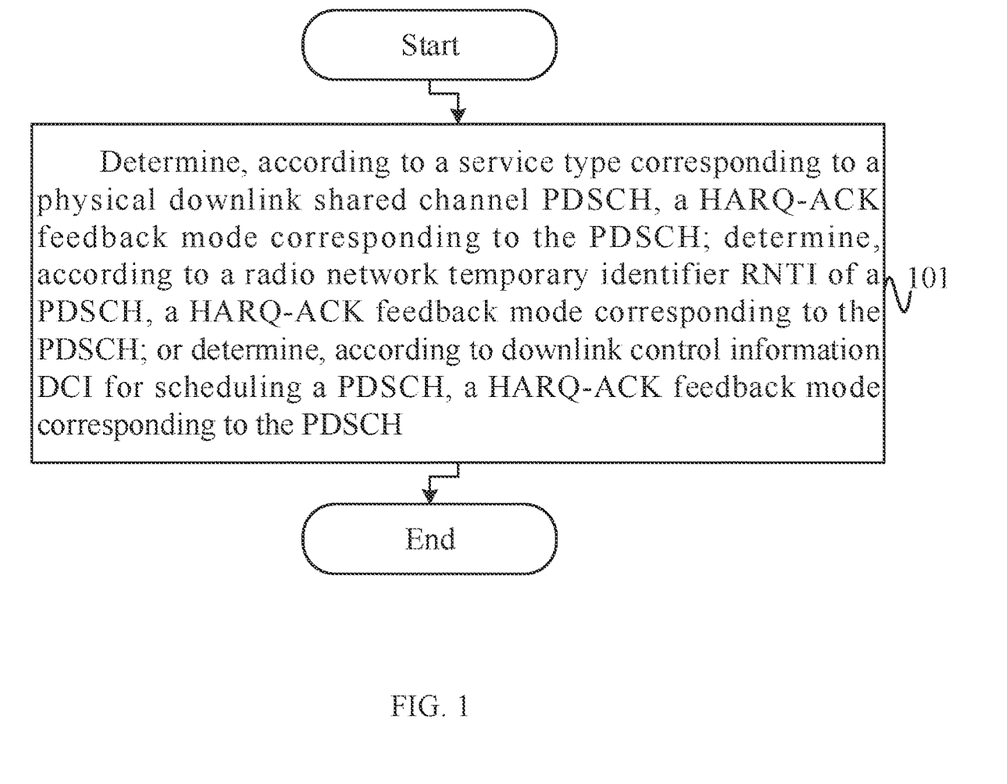
FIG. 1 is a schematic diagram of steps of a HARQ-ACK feedback mode determining method according to an embodiment of the present disclosure.

As shown in FIG. 1, an embodiment of the present disclosure provides a HARQ-ACK feedback mode determining method, applied to a communication device, including:

Step 101: Determine, according to a service type corresponding to a PDSCH, a HARQ-ACK feedback mode corresponding to the PDSCH. In some embodiments, PDSCHs of different service types correspond to different HARQ-ACK feedback modes.

In some embodiments, it is determined, according to a RNTI of a PDSCH, a HARQ-ACK feedback mode corresponding to the PDSCH. In some embodiments, PDSCHs scheduled by different RNTIs correspond to different HARQ-ACK feedback modes.

In some embodiments, it is determined, according to DCI for scheduling a PDSCH, a HARQ-ACK feedback mode corresponding to the PDSCH.

As an embodiment, the determining, according to DCI for scheduling a PDSCH, a HARQ-ACK feedback mode corresponding to the PDSCH includes at least one of the following:

determining, according to a first indicator field carried by the DCI, the HARQ-ACK feedback mode of the PDSCH that is indicated by the first indicator field; that is, determining, through the indication of the first indicator field, the HARQ-ACK feedback mode corresponding to the PDSCH;

determining, according to a control resource set of the DCI, the HARQ-ACK feedback mode corresponding to the PDSCH; that is, implicitly determining, through the COntrol REsource SET (CORESET) of the DCI, the HARQ-ACK feedback mode corresponding to the PDSCH; where, for example, PDSCHs scheduled by DCI of different control resource sets correspond to different HARQ-ACK feedback modes;

determining, according to a search space of the DCI, the HARQ-ACK feedback mode corresponding to the PDSCH; that is, implicitly determining, through the search space of the DCI, the HARQ-ACK feedback mode corresponding to the PDSCH; where, for example, PDSCHs scheduled by DCI of different search spaces correspond to different HARQ-ACK feedback modes;

determining, according to a format of the DCI, the HARQ-ACK feedback mode corresponding to the PDSCH; that is, implicitly determining, through the format of the DCI, the HARQ-ACK feedback mode corresponding to the PDSCH; where, for example, PDSCHs scheduled by DCI of different formats correspond to different HARQ-ACK feedback modes; and determining, according to a cyclic redundancy check CRC RNTI scrambling the DCI, the HARQ-ACK feedback mode corresponding to the PDSCH; that is, implicitly determining, through the RNTI, the HARQ-ACK feedback mode corresponding to the PDSCH; where, for example, PDSCHs scheduled by DCI scrambled by different RNTIs correspond to different HARQ-ACK feedback modes.

For example, the format of the DCI for scheduling the PDSCH includes DCI 1_0 and DCII 1_1. DCI 1_0 can only be used to schedule a unicast PDSCH, while DCI 1_1 can schedule both a unicast PDSCH and a multicast PDSCH. Besides, the first indicator field in the DCI or the CRC RNTI scrambling the DCI indicates whether a multicast PDSCH or a unicast PDSCH is scheduled. The HARQ-ACK feedback mode of a unicast PDSCH is mode 2 (for example, the terminal feeds back, according to a decoding result of each PDSCH, ACKs or NACKs corresponding to multiple PDSCHs). A multicast PDSCH corresponds to another HARQ-ACK feedback mode (for example, the terminal only feeds back a 1-bit NACK for decoding results of one or more PDSCHs). Therefore, after receiving a PDSCH, the terminal needs to determine, according to a format of DCI and a first indicator field in the DCI or a CRC RNTI scrambling the DCI, a HARQ-ACK feedback mode corresponding to the PDSCH.

As an embodiment of the present disclosure, the HARQ-ACK feedback mode includes at least one of the following:

a first mode: no HARQ-ACK feedback;

a second mode: HARQ-ACK feedback; where the HARQ-ACK feedback includes: Negative ACKnowledgment only feedback (NACK only feedback), or ACKnowledgment or Negative ACKnowledgment feedback (ACK/NACK feedback);

a third mode: HARQ-ACK feedback triggered by a network side device; where the HARQ-ACK feedback includes: NACK only feedback, or ACK/NACK feedback;

a fourth mode: periodic HARQ-ACK feedback; where the HARQ-ACK feedback includes: NACK only feedback, or ACK/NACK feedback; and a fifth mode: HARQ-ACK feedback based on link measurement; where the HARQ-ACK feedback includes: NACK only feedback, or ACK/NACK feedback.

The first mode can also be called mode 0: no HARQ-ACK feedback. That is, the terminal does not feed back a HARQ-ACK after receiving a PDSCH. This mode is mainly suitable for scenarios in which PDSCH retransmission scheduling is not required, or the service reliability requirement is not high, or uplink feedback resources are limited.

The second mode mainly includes mode 1 (NACK only feedback) and/or mode 2 (ACK/NACK feedback), that is, the terminal needs to feed back a negative acknowledgement after receiving a PDSCH, or feed back an acknowledgement or a negative acknowledgement.

For Mode 1: NACK Only Feedback.

After receiving the PDSCH, the terminal feeds back NACK only when PDSCH decoding fails. Otherwise, the terminal does not feed back HARQ-ACK information.

In some embodiments, if the terminal needs to feed back HARQ-ACK information of multiple PDSCHs in one time unit, the terminal can determine, according to a ratio of NACKs to ACKs in ACK or NACK information corresponding to the multiple PDSCHs, whether to feed back NACKs (for example, when the ratio of NACKs to ACKs is greater than a threshold, the terminal feeds back NACK), or determine a NACK in a specific state to be fed back (for example, different ranges of ratios of NACKs to ACKs correspond to NACKs in different states).

In some embodiments, the network side device can configure one resource for the terminal to feed back a NACK. Compared with multiple Physical Uplink Control Channel (PUCCH) resources, the terminal is only configured with one PUCCH resource, and no additional PUCCH resource indication method is required. This simplifies scheduling of the base station, and the base station can configure a same PUCCH resource for multiple terminals, saving system resources.

In some embodiments, the network side device configures multiple PUCCH resources for the terminal, and a resource for feeding back a NACK is determined in any one of the following manners:

a PUCCH resource is indicated by DCI (for example, a PUCCH Resource Indicator, a PRI, or a PUCCH resource identifier in DCI);

a PUCCH resource is determined based on an index of the first Control Channel Element CCE of a CORESET of a PRI and DCI;

the terminal selects a resource randomly or at equal probabilities;

a terminal-specific offset (the terminal-specific offset may be configured through RRC signaling or obtained according to a terminal-related identifier or the like); and a PUCCH resource is determined according to a terminal identifier or the like.

Compared with one PUCCH resource, when multiple PUCCH resources are configured, the base station can flexibly instruct the terminal to use a specific PUCCH resource, or the terminal can determine a corresponding resource, which can avoid a problem that too many terminals feed back NACKs on a same PUCCH resource, which may lead to an excessively large change range of the receive power of the base station, and affects Automatic Gain Control (AGC) of reception of the base station.

In this mode, the terminal feeds back a NACK only when PDSCH decoding fails. For a multicast PDSCH, the base station can configure that multiple terminals use a same PUCCH resource to feed back NACKs, which saves resources and simplifies resource allocation.

For Mode 2: ACK/NACK Feedback.

After receiving a PDSCH, the terminal feeds back an ACK or a NACK according to a PDSCH decoding result.

In some embodiments, if the terminal needs to feed back HARQ-ACK information of multiple PDSCHs in one time unit, the terminal can determine, according to a ratio of NACKs to ACKs in ACK or NACK information corresponding to the multiple PDSCHs, whether to feed back ACKs or NACKs (for example, when the ratio of ACKs to NACKs is greater than a threshold, the terminal feeds back an ACK; otherwise, feeds back a NACK).

In some embodiments, if the terminal needs to feed back HARQ-ACK information of multiple PDSCHs in one time unit, the terminal may feed back multi-bit ACK or NACK information corresponding to the multiple PDSCHs.

In some embodiments, the network side device may configure one or more resources for the terminal to feed back an ACK or a NACK.

When the terminal is configured with multiple PUCCH resources, the terminal determines one PUCCH resource according to a number of bits of a HARQ-ACK to be fed back. In some embodiments, the network side device configures multiple PUCCH resources for the terminal, and a PUCCH resource is determined in any one of the following manners:

a PUCCH resource is indicated by DCI;

a PUCCH resource is determined by a terminal-specific offset (the terminal-specific offset may be configured through RRC signaling or obtained according to a terminal-related identifier or the like);

the terminal selects a resource randomly or at equal probabilities; and a PUCCH resource is determined according to a terminal identifier or the like.

When one PUCCH resource is configured, the terminal does not need any additional indication or determining manner to determine a resource to be used. Compared with configuring one PUCCH resource, when multiple resources are configured, the terminal can flexibly determine a specific feedback resource according to instruction of the base station or according to a predetermined rule (such as a number of bits of Uplink Control information (UCI)), and system scheduling is more flexible.

In this mode, the terminal feeds back an ACK or a NACK according to a decoding result of each PDSCH, and the network side device can perform retransmission scheduling of each PDSCH according to a NACK feedback corresponding to the corresponding PDSCH, or perform link adaptive adjustment (such as Modulation and Coding Scheme MCS or transmit power) according to the ACK or NACK feedback.

The third mode can also be called mode 3, that is, HARQ-ACK feedback based on triggering. The terminal temporarily does not feed back a HARQ-ACK after receiving a PDSCH. The terminal does not feed back HARQ-ACK information of one or more previously scheduled PDSCHs until the network side device triggers (terminal-specific DCI trigger or group common DCI trigger). In this mode, the terminal may only feed back a NACK, or the terminal may feed back an ACK or a NACK.

In this mode, the terminal only feeds back when the network side triggers the feedback, and the base station can trigger according to system service requirements, which can meet the service requirements while saving feedback resources.

Figure 2:
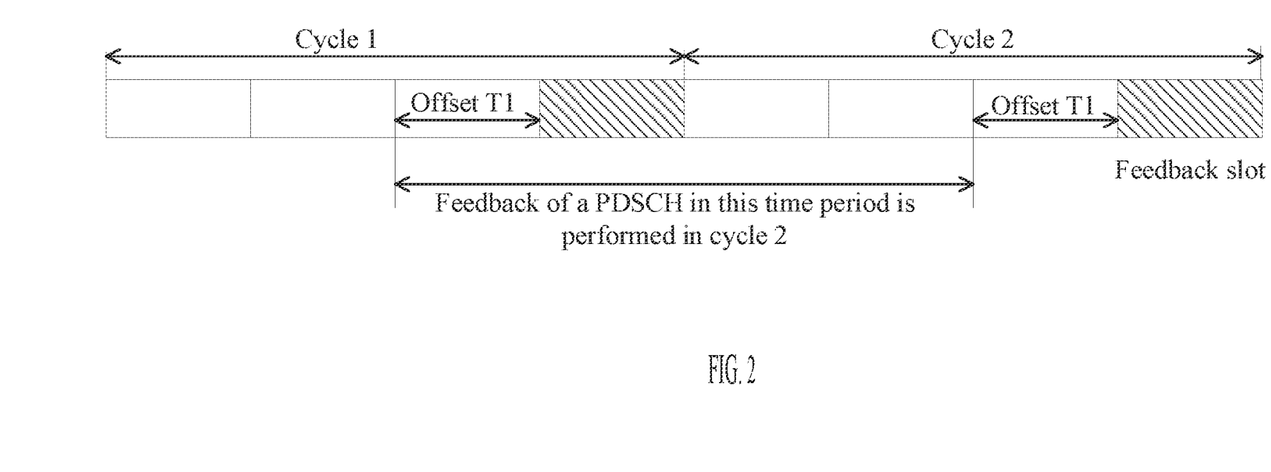
FIG. 2 is a schematic diagram of an example of a fourth mode in a HARQ-ACK feedback mode determining method according to an embodiment of the present disclosure.

The fourth mode can also be called mode 4, that is, periodic HARQ-ACK feedback. For periodic triggering, the network side device configures a feedback period and a feedback time unit for the terminal to feedback a HARQ-ACK, and the terminal feeds back, in a specific time unit (slot or sub-slot), a HARQ-ACK of a PDSCH scheduled within a time period. The time period may be a feedback cycle for HARQ-ACK feedback configured by the network side device. In some embodiments, as shown in FIG. 2, since PDSCH processing takes time, the HARQ-ACK is not immediately fed back after the PDSCH is received, instead the PDSCH needs to be processed for some time. Therefore, the time period may also be obtained by offsetting the feedback cycle forwards by a time T1. In some embodiments, the value of T1 may be 0.

The fifth mode may also be called mode 5, that is, HARQ-ACK feedback based on link measurement. In this mode, in a case that a link measurement result meets a target threshold requirement, triggering HARQ-ACK feedback.

For example, the terminal performs HARQ-ACK feedback based on a Reference Signal Received Power (RSRP), a Channel Quality Indicator (CQI), a moving speed, or the like. In some embodiments, when a downlink RSRP or CQI is lower than a threshold (indicating that the terminal may be at the edge of a cell) or when a movement speed of the terminal exceeds a threshold, the terminal does not feed back a HACK, or when the terminal is configured with a corresponding PUCCH resource, if the downlink RSRP or CQI or the moving speed is lower than a threshold, the terminal feeds back a NACK on the resource.

For another example, the terminal performs HARQ-ACK feedback based on measurement such as a reference signal received power RSRP or a channel quality indicator CQI or a moving speed. In some embodiments, according to a measured RSRP or CQI, the terminal measures whether the measured RSRP or CQI meets a target threshold requirement. Because the RSRP is related to a distance between the terminal and the base station or a channel state, if the RSRP is excessively small, it means that the terminal is far away from the base station or the channel state is poor; if the RSRP is large, it indicates that the terminal is close to the base station or the channel condition is very good. For example, when the RSRP is greater than threshold 1 and less than threshold 2, the terminal feeds back HARQ-ACK information; otherwise, the terminal does not feed back HARQ-ACK information. In this way, the HARQ-ACK feedback received by the base station is neither a feedback from a terminal at the cell center or with a very good channel condition (which may be mainly ACKs), nor a feedback from a terminal at the cell edge or with a very poor channel condition (which may be mainly NACKs). The base station performs PDSCH scheduling based on these HARQ-ACK feedbacks. (In a broadcast/multicast service system, the base station cannot consider only the reception situation of a terminal at the cell center or with a very good channel condition, and also considers a terminal far away from the cell or with a poor channel condition. However, if some terminals are excessively far away or channel conditions are excessively poor, these terminals cannot be a deciding factor in scheduling decision of the base station).

In this mode, the network can consider whether it is worthwhile to retransmit for a terminal at the cell edge or moving excessively fast (the terminal may be excessively far away or move excessively fast, and no matter how the retransmission is performed, a result is failure and resources are wasted), or can consider whether to select a new resource (low-order MCS, that is, a low-order modulation and coding scheme, higher transmit power, changing a serving cell, or the like) for the terminal at the cell edge or moving fast.

It should be noted that, in the second mode to the fifth mode provided in the embodiments of the present disclosure, the terminal may feed back a multi-bit HARQ-ACK in an uncompressed manner (for example, a corresponding NACK or ACK is fed back for each PDSCH; and for another example, a corresponding NACK is fed back for each PDSCH that fails in decoding); or the terminal may feed back an X-bit HARQ-ACK in a compressed manner (for example, 1 bit, that is, HARQ-ACK information corresponding to multiple PDSCHs is jointly compressed, for example, when a ratio of NACKs to ACKs corresponding to the multiple PDSCHs exceeds a threshold, the terminal feeds back a NACK otherwise the terminal feeds back an ACK or does not feed back (NACK only)).

In conclusion, in the embodiments of the present disclosure, the network side device configures the corresponding HARQ-ACK feedback mode for each service type or each RNTI scrambling a PDSCH, or the network side device indicates the HARQ-ACK feedback mode of the PDSCH through DCI, so that different services with different requirements are configured with different HARQ-ACK feedback modes, which improves system efficiency and can effectively reduce uplink feedback overheads.

Figure 3:
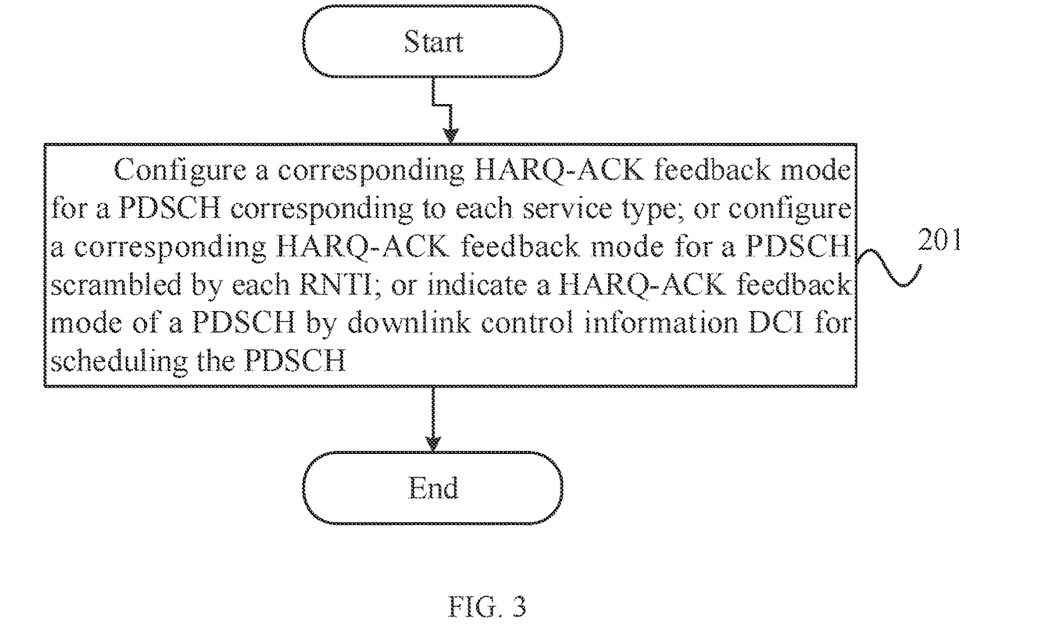
FIG. 3 is a schematic diagram of steps of a HARQ-ACK feedback mode configuration method according to an embodiment of the present disclosure.

As shown in FIG. 3, the embodiments of the present disclosure also provide a HARQ-ACK feedback mode configuration method, applied to network side device and including:

Step 201: Configure a corresponding HARQ-ACK feedback mode for a PDSCH corresponding to each service type. In some embodiments, PDSCHs of different service types correspond to different HARQ-ACK feedback modes.

In some embodiments, a corresponding HARQ-ACK feedback mode is configured for each RNTI scrambling a PDSCH. In some embodiments, PDSCHs scheduled by different RNTIs correspond to different HARQ-ACK feedback modes.

In some embodiments, a HARQ-ACK feedback mode of a PDSCH is indicated by DCI for scheduling the PDSCH.

As an embodiment, the indicating a HARQ-ACK feedback mode of the PDSCH by DCI for scheduling a PDSCH includes at least one of the following:

indicating the HARQ-ACK feedback mode by a first indicator field carried by the DCI; that is, directly indicating, by the first indicator field, the HARQ-ACK feedback mode corresponding to the PDSCH;

indicating, through a control resource set of the DCI, the HARQ-ACK feedback mode corresponding to the PDSCH; that is, implicitly indicating, through the CORESET of the DCI, the HARQ-ACK feedback mode corresponding to the PDSCH; where, for example, PDSCHs scheduled by DCI of different control resource sets correspond to different HARQ-ACK feedback modes;

indicating, through a search space of the DCI, the HARQ-ACK feedback mode corresponding to the PDSCH; that is, implicitly indicating, through the search space of the DCI, the HARQ-ACK feedback mode corresponding to the PDSCH; where, for example, PDSCHs scheduled by DCI of different search spaces correspond to different HARQ-ACK feedback modes;

indicating, through a format of the DCI, the HARQ-ACK feedback mode corresponding to the PDSCH; that is, implicitly indicating, through the format of the DCI, the HARQ-ACK feedback mode corresponding to the PDSCH; where, for example, PDSCHs scheduled by DCI of different formats correspond to different HARQ-ACK feedback modes; and indicating, according to a cyclic redundancy check CRC RNTI scrambling the DCI, the HARQ-ACK feedback mode corresponding to the PDSCH; that is, implicitly indicating, through the RNTI, the HARQ-ACK feedback mode corresponding to the PDSCH; where, for example, PDSCHs scheduled by DCI scrambled by different RNTIs correspond to different HARQ-ACK feedback modes.

For example, the format of the DCI for scheduling the PDSCH includes DCI 1_0 and DCI 1_1. DCI 1_0 can only be used to schedule a unicast PDSCH, while DCI 1_1 can schedule both a unicast PDSCH and a multicast PDSCH. Besides, the first indicator field in the DCI or the CRC RNTI scrambling the DCI indicates whether a multicast PDSCH or a unicast PDSCH is scheduled. The HARD-ACK feedback mode of a unicast PDSCH is mode 2 (for example, the terminal feeds back, according to a decoding result of each PDSCH, ACKs or NACKs corresponding to multiple PDSCHs). A multicast PDSCH corresponds to another HARQ-ACK feedback mode (for example, the terminal only feeds back a 1-bit NACK for decoding results of one or more PDSCHs). Therefore, after receiving a PDSCH, the terminal needs to determine, according to a format of DCI and a first indicator field in the DCI or a CRC RNTI scrambling the DCI, a HARQ-ACK feedback mode corresponding to the PDSCH.

As an embodiment of the present disclosure, the HARQ-ACK feedback mode includes at least one of the following:
  a first mode: no HARQ-ACK feedback;
  a second mode: HARQ-ACK feedback; where the HARQ-ACK feedback includes: NACK only feedback, or ACK/NACK feedback;
  a third mode: HARQ-ACK feedback triggered by a network side device; where the HARQ-ACK feedback includes: NACK only feedback, or ACK/NACK feedback;
  a fourth mode: periodic HARQ-ACK feedback; where the HARQ-ACK feedback includes: NACK only feedback, or ACK/NACK feedback;
  a fifth mode: HARQ-ACK feedback based on link measurement; where the HARQ-ACK feedback includes: NACK only feedback, or ACK/NACK feedback.

The relevant explanations of the first mode to the fifth mode have been explained in detail in the HARQ-ACK feedback mode determining method applied to the communication device, and are also applicable in this embodiment. Details are not described herein.

The HARQ-ACK feedback based on lint measurement in the fourth mode includes:
  in a case that a link measurement result meets a target threshold requirement, triggering HARQ-ACK feedback.

For example, the terminal performs HARQ-ACK feedback based on a reference signal received power RSRP or a channel quality indicator CQI or a moving speed or the like. In some embodiments, when a downlink RSRP or CQI is lower than a threshold (indicating that the terminal is at the edge of a cell) or when a movement speed of the terminal exceeds a threshold, the terminal does not feed back a NACK, or when the terminal is configured with a corresponding PUCCH resource, if the downlink RSRP or CQI or the moving speed is lower than a threshold, the terminal feeds back a NACK on the resource.

In this mode, the network can consider whether it is worthwhile to retransmit for a terminal at the cell edge or moving excessively fast (the terminal may be excessively far away or move excessively fast, and no matter how the retransmission is performed, a result is failure and resources are wasted), or can consider whether to select a new resource (low-order MCS, higher transmit power, or the like) for the terminal at the cell edge or moving fast.

It should be noted that, in the second mode to the fifth mode provided in the embodiments of the present disclosure, the terminal may feed back a multi-bit HARQ-ACK in an uncompressed manner (for example, a corresponding NACK or ACK is fed back for each PDSCH; and for another example, a corresponding NACK is fed back for each PDSCH that fails in decoding); or the terminal may feed back an X-bit HARQ-ACK in a compressed manner (for example, 1 bit, that is, HARQ-ACK information corresponding to multiple PDSCHs is jointly compressed, for example, when a NACK/ACK ratio corresponding to the multiple PDSCHs exceeds a threshold, the terminal feeds back a NACK, otherwise the terminal feeds back an ACK or does not feed back (NACK only)).

It should be noted that, in a HARQ-ACK feedback mode determining method provided by the present disclosure, specific HARQ-ACK feedback modes may also include other modes, which are not listed one by one herein.

EXAMPLE

It is assumed that the network side device configures, through higher layer signaling, a list of ongoing MBMS sessions transmitted through a Single Cell MBMS Point to Multipoint Radio Bearer (SC-MRB). For each MBMS session, the network side device configures an associated g-RNTI and scheduling information. The network side device can also configure a HARQ-ACK feedback mode related to the MBMS session, that is, the base station configures an associated HARQ-ACK feedback mode for each g-RNTI. Different g-RNTIs can be associated with different HARQ-ACK feedback modes. When the network side device scrambles the PDCCH for scheduling a multicast service and/or a multicast PDSCH through a g-RNTI, the terminal determines a corresponding HARQ-ACK feedback mode through the g-RNTI used for the PDCCH or PDSCH, and then performs HARQ-ACK feedback.

In some embodiments, the network side device indicates a corresponding HARQ-ACK feedback mode through DCI when scheduling PDSCH, for example:

1) The DCI includes an X-bit HARQ-ACK feedback mode indicator field, for example, X=2. Then, 4 different states corresponding to 00, 01, 10, and 11 can respectively correspond to a maximum of 4 different HARQ-ACK feedback modes.
2) Some fields in DCI are reused. For example, Frequency Domain Resource Allocation (FDRA), Time Domain Resource Allocation (TDRA), Redundancy Version (RV), HARQ process number, and the like are used to indicate the HARQ-ACK feedback mode.
3) A HARQ-ACK feedback mode is determined based on a CORESET or a search space of the DCI or a DCI format or an RNTI, for example, a DCI format corresponds to different HARQ-ACK feedback modes in different CORESETs. A correspondence between the HARQ-ACK feedback mode and a CORESET or a search or a DCI format or an RNTI may be configured through RRC signaling or predefined.

In conclusion, in the embodiments of the present disclosure, the network side device configures the corresponding HARQ-ACK feedback mode for each service type or each RNTI scrambling a PDSCH, or the network side device indicates the HARQ-ACK feedback mode of the PDSCH through DCI, so that different services with different requirements are configured with different HARQ-ACK feedback modes, which improves system efficiency and can effectively reduce uplink feedback overheads.

Figure 4:
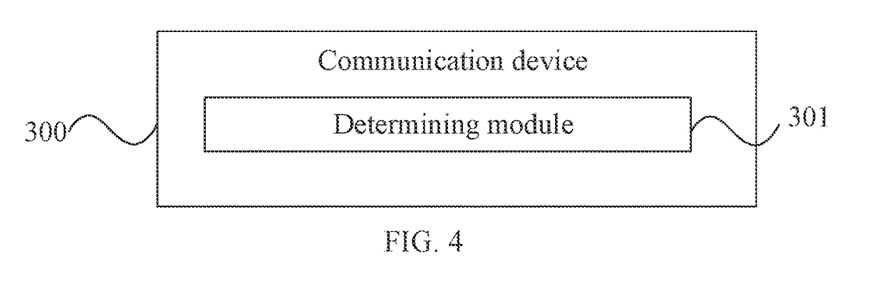
FIG. 4 is a schematic structural diagram of a communication device according to an embodiment of the present disclosure.

As shown in FIG. 4, an embodiment of the present disclosure further provides a communication device 300, including:

a determining module 301, configured to determine, according to a service type corresponding to a PDSCH, a HARQ-ACK feedback mode corresponding to the PDSCH;

or configured to determine, according to a RNTI of a PDSCH, a HARQ-ACK feedback mode corresponding to the PDSCH;

or configured to determine, according to DCI for scheduling a PDSCH, a HARQ-ACK feedback mode corresponding to the PDSCH.

For example, in the above embodiment of the present disclosure, the determining module 301 includes at least one of the following submodules:

a first determining submodule, configured to determine, according to a first indicator field carried by the DCI, the HARQ-ACK feedback mode of the PDSCH that is indicated by the first indicator field;

a second determining submodule, configured to determine, according to a control resource set of the DCI, the HARQ-ACK feedback mode corresponding to the PDSCH;

a third determining submodule, configured to determine, according to a search space of the DCI, the HARQ-ACK feedback mode corresponding to the PDSCH;

a fourth determining submodule, configured to determine, according to a format of the DCI, the HARQ-ACK feedback mode corresponding to the PDSCH; and a fifth determining submodule, configured to determine, according to a cyclic redundancy check CRC RNTI scrambling the DCI, the HARQ-ACK feedback mode corresponding to the PDSCH.

For example, in the foregoing embodiment of the present disclosure, the HARQ-ACK feedback mode includes at least one of the following:

a first mode: no HARQ-ACK feedback;
a second mode: HARQ-ACK feedback;
a third mode: HARQ-ACK feedback triggered by a network side device;
a fourth mode: periodic HARQ-ACK feedback; and
a fifth mode: HARQ-ACK feedback based on link measurement.

For example, in the above embodiment of the present disclosure, the HARQ-ACK feedback includes: negative acknowledgment only feedback, or acknowledgment or negative acknowledgment feedback.

For example, in the above embodiment of the present disclosure, the HARQ-ACK feedback based on link measurement includes:

in a case that a link measurement result meets a target threshold requirement, triggering HARQ-ACK feedback.

In conclusion, in the embodiments of the present disclosure, the network side device configures the corresponding HARQ-ACK feedback mode for each service type or each RNTI scrambling a PDSCH, or the network side device indicates the HARQ-ACK feedback mode of the PDSCH through DCI, so that different services with different requirements are configured with different HARQ-ACK feedback modes, which improves system efficiency and can effectively reduce uplink feedback overheads.

It should be noted that the communication device provided by the embodiments of the present disclosure is a communication device capable of executing the foregoing HARQ-ACK feedback mode determining method. All embodiments of the HARQ-ACK feedback mode determining method are applicable to the communication device, and can achieve the same or similar beneficial effects.

For example, an embodiment of the present disclosure further provides a communication device, including a processor, a memory, and a computer program stored in the memory and executable on the processor. The computer program, when executed by the processor, implements each process of the foregoing embodiment of the HARQ-ACK feedback mode determining method, and a same technical effect can be achieved. To avoid repetition, details are not described herein.

Embodiments of the present disclosure further provide a computer readable storage medium. The computer readable storage medium stores a computer program. The computer program, when executed by a processor, implements each process of the foregoing embodiment of the HARQ-ACK feedback mode determining method, and a same technical effect can be achieved. To avoid repetition, details are not described herein again. The computer-readable storage medium is, for example, a Read-Only Memory (ROM), a Random Access Memory (RAM), a magnetic disk, or an optical disc.

The embodiments of the present disclosure further provide a chip, including a processor and a communication interface. The communication interface is coupled to the processor, and the processor is configured to run a program or an instruction to implement steps of the foregoing HARQ-ACK feedback mode determining method.

The embodiments of the present disclosure further provide a computer program product. The computer program product is executed by a processor to implement steps of the foregoing HARQ-ACK feedback mode determining method, and a same technical effect can be achieved. To avoid repetition, details are not described herein again.

The embodiments of the present disclosure further provide a control apparatus, configured to implement steps of the foregoing HARQ-ACK feedback mode determining method, and a same technical effect can be achieved. To avoid repetition, details are not described herein again.

Figure 5:
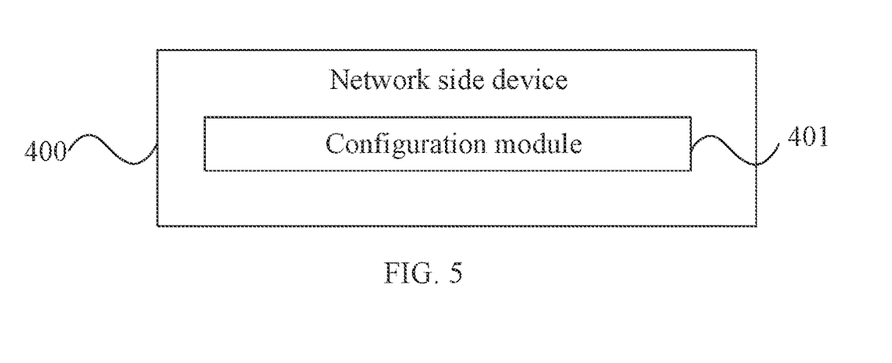
FIG. 5 is a first schematic structural diagram of a network side device according to an embodiment of the present disclosure.

As shown in FIG. 5, an embodiment of the present disclosure further provides a network side device 400, including:
  a configuration module 401, configured to configure a corresponding HARQ-ACK feedback mode for a PDSCH corresponding to each service type;
  or configured to configure a corresponding HARQ-ACK feedback mode for each RNTI scrambling a PDSCH;
  or configured to indicate a HARQ-ACK feedback mode of a PDSCH by DCI for scheduling the PDSCH.

For example, in the above embodiment of the present disclosure, the configuration module includes at least one of the following submodules:
  a first configuration submodule, configured to indicate the HARQ-ACK feedback mode through a first indicator field carried by the DCI;
  a second configuration submodule, configured to indicate, through a control resource set of the DCI, the HARQ-ACK feedback mode corresponding to the PDSCH;
  a third configuration submodule, configured to indicate, through a search space of the DCI, the HARQ-ACK feedback mode corresponding to the PDSCH;
  a fourth configuration submodule, configured to indicate, according to a format of the DCI, the HARQ-ACK feedback mode corresponding to the PDSCH; and
  a fifth configuration submodule, configured to indicate, through a Cyclic Redundancy Check (CRC) RNTI scrambling the DCI, the HARQ-ACK feedback mode corresponding to the PDSCH.

For example, in the foregoing embodiment of the present disclosure, the HARQ-ACK feedback mode includes at least one of the following:
  a first mode: no HARQ-ACK feedback;
  a second mode: HARQ-ACK feedback;
  a third mode: HARQ-ACK feedback triggered by a network side device;
  a fourth mode: periodic HARQ-ACK feedback; and
  a fifth mode: HARQ-ACK feedback based on link measurement.

For example, in the above embodiment of the present disclosure, the HARQ-ACK feedback includes: negative acknowledgment only feedback, or acknowledgment or negative acknowledgment feedback.

For example, in the above embodiment of the present disclosure, the HARQ-ACK feedback based on link measurement includes:
  in a case that a link measurement result meets a target threshold requirement, triggering HARQ-ACK feedback.

In conclusion, in the embodiments of the present disclosure, the network side device configures the corresponding HARQ-ACK feedback mode for each service type or each RNTI scrambling a PDSCH, or the network side device indicates the HARQ-ACK feedback mode of the PDSCH through DCI, so that different services with different requirements are configured with different HARQ-ACK feedback modes, which improves system efficiency and can effectively reduce uplink feedback overheads.

It should be noted that the network side device provided in this embodiment of the present disclosure is a network side device capable of performing the HARQ-ACK feedback mode configuration method, all embodiments of the HARQ-ACK feedback mode configuration method are applicable to the network side device, and a same or similar beneficial effect can be achieved.

Figure 6:
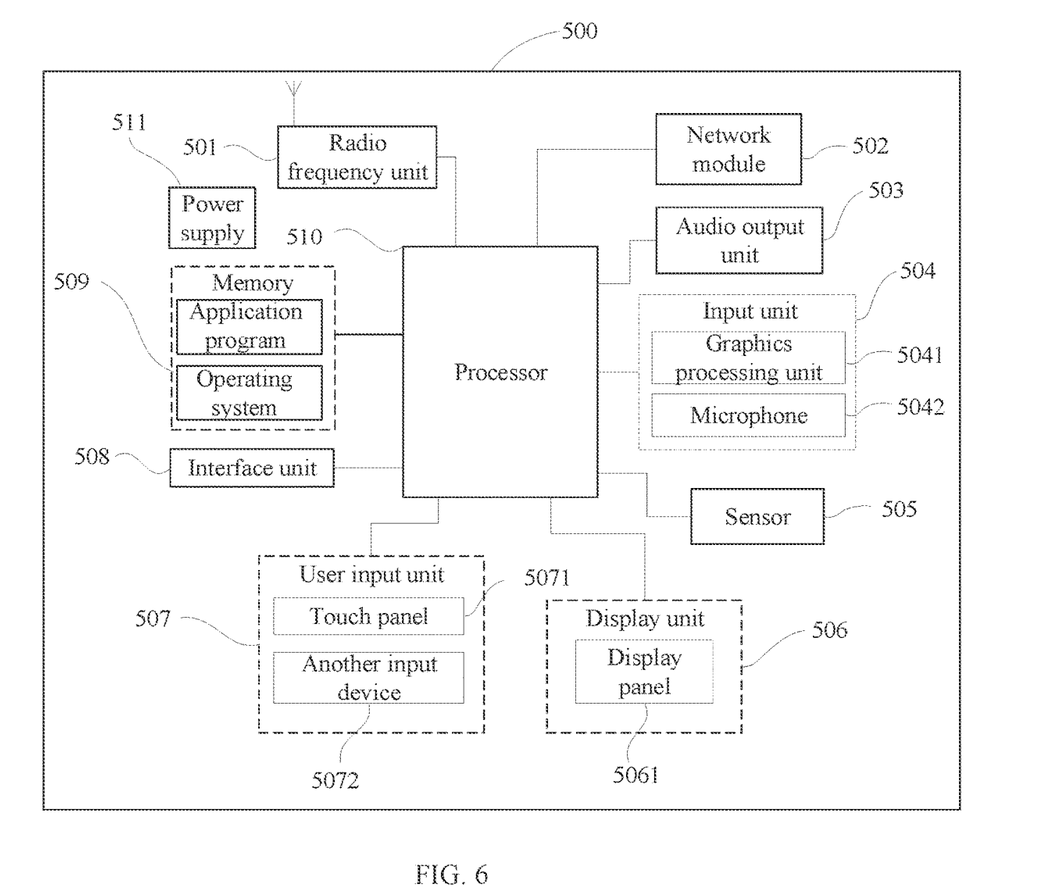
FIG. 6 is a schematic structural diagram of a terminal according to an embodiment of the present disclosure.

FIG. 6 is a schematic diagram of a hardware structure of a terminal according to the embodiments of the present disclosure. A terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that a structure of the terminal shown in FIG. 6 does not constitute a limitation on the terminal, and the terminal may include more or fewer components than those shown in the figure, or combine some components, or have different component arrangements.

In a case that the communication device is a terminal, the processor 510 is configured to determine, according to a service type corresponding to a PDSCH, a HARQ-ACK feedback mode corresponding to the PDSCH;

or determining, according to a RNTI of a PDSCH, a HARQ-ACK feedback mode corresponding to the PDSCH;

or determining, according to DCI for scheduling a PDSCH, a HARQ-ACK feedback mode corresponding to the PDSCH.

To sum up, in the embodiments of the present disclosure, the terminal determines the HARQ-ACK feedback mode of the PDSCH according to the service type or the RNTI or indication of the DCI, so that different services with different requirements correspond to different HARQ-ACK feedback modes, thereby improving the system efficiency and effectively reducing uplink feedback overheads.

It should be noted that the terminal provided by the embodiments of the present disclosure is a terminal capable of executing the foregoing HARQ-ACK feedback mode determining method. All embodiments of the HARQ-ACK feedback mode determining method are applicable to the terminal, and can achieve the same or similar beneficial effects.

It should be understood that in this embodiment of the present disclosure, the radio frequency unit 501 may be configured to receive and transmit information, or receive and transmit signals during a call. In some embodiments, the radio frequency unit transmits downlink data to the processor 510 for processing after receiving the downlink data from a base station; and transmits uplink data to the base station. Usually, the radio frequency unit 501 includes but is not limited to an antenna, at least one amplifier, a transceiver, a coupler, a low noise amplifier, a duplexer, and the like. In addition, the radio frequency unit 501 may communicate with a network and another device through a wireless communication system.

The terminal provides wireless broadband Internet access to a user through the network module 502, for example, helps the user receive and send e-mails, browse web pages, access streaming media, and the like.

The audio output unit 503 may convert audio data received by the radio frequency unit 501 or the network module 502 or stored in the memory 509 into an audio signal and output the audio signal as a sound. In addition, the audio output unit 503 may further provide an audio output (for example, a call signal received voice, or a message received voice) related to a specific function implemented by the terminal 500. The audio output unit 503 includes a loudspeaker, a buzzer, a telephone receiver, and the like.

The input unit 504 is configured to receive an audio signal or a video signal. The input unit 504 may include a Graphics Processing Unit (GPU) 5041 and a microphone 5042. The graphics processing unit 5041 processes image data of a static picture or a video obtained by an image capture apparatus (for example, a camera) in video capture mode or image capture mode. A processed image frame may be displayed on the display unit 506. The image frame processed by the graphics processing unit 5041 may be stored in the memory 509 (or another storage medium) or sent by using the radio frequency unit 501 or the network module 502. The microphone 5042 may receive sound and can process such sound into audio data. The processed audio data may be converted in a call mode into a format that can be sent by the radio frequency unit 501 to a mobile communication base station for outputting.

The terminal 500 further includes at least one sensor 505, for example, a light sensor, a motion sensor, and another sensor. In some embodiments, the light sensor includes an ambient light sensor and a proximity sensor, where the ambient light sensor can adjust brightness of the display panel 5061 based on brightness of ambient light, and the proximity sensor can turn off the display panel 5061 and/or backlight when the terminal 500 moves towards the ear. As a type of the motion sensor, an accelerometer sensor may detect an acceleration value in each direction (generally, three axes), and detect a value and a direction of gravity when the accelerometer sensor is static, and may be configured to recognize a terminal posture (such as screen switching between landscape and portrait modes, a related game, or magnetometer posture calibration), a function related to vibration recognition (such as a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by a user or information provided for a user. The display unit 506 may include a display panel 5061, and the display panel 5061 may be configured in a form of a Liquid Crystal Display (LCD), an Organic Light-Emitting Diode (OLED), or the like.

The user input unit 507 may be configured to receive input digit or character information and generate key signal input related to user setting and function control of the terminal. In some embodiments, the user input unit 507 includes a touch panel 5071 and another input device 5072. The touch panel 5071 is also referred to as a touchscreen, and may collect a touch operation performed by a user on or near the touch panel (for example, an operation performed by a user on the touch panel 5071 or near the touch panel 5071 by using any proper object or accessory, for example, a finger or a stylus). The touch panel 5071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 510, and receives and executes a command sent by the processor 510. In addition, the touch panel 5071 may be implemented in various types such as a resistor, a capacitor, an infrared ray, or a surface acoustic wave. The user input unit 507 may include other input devices 5072 in addition to the touch panel 5071. In some embodiments, the another input device 5072 may include but is not limited to: a physical keyboard, function keys (for example, a volume control key and an on/off key), a trackball, a mouse, or a joystick. Details are not described herein.

Further, the touch panel 5071 may cover the display panel 5061. When detecting a touch operation on or near the touch panel, the touch panel 5071 transmits the touch operation to the processor 510 to determine a type of a touch event. Then, the processor 510 provides corresponding visual output on the display panel 5061 based on the type of the touch event. In FIG. 6, the touch panel 5071 and the display panel 5061 are used as two independent components to implement input and output functions of the terminal. However, in some embodiments, the touch panel 5071 and the display panel 5061 may be integrated to implement the input and output functions of the terminal. This is not specifically limited herein.

The interface unit 508 is an interface connecting an external apparatus to the terminal 500. For example, the external apparatus may include a wired or wireless headset jack, an external power supply (or a battery charger) port, a wired or wireless data port, a storage card port, a port for connecting an apparatus having an identification module, an audio Input/Output (I/O) port, a video I/O port, a headset jack, or the like. The interface unit 508 may be configured to receive input (for example, data information and power) from the external apparatus and transmit the received input to one or more elements in the terminal 500, or may be configured to transmit data between the terminal 500 and the external apparatus.

The memory 509 may be configured to store a software program and various data. The memory 509 may mainly include a program storage area and a data storage area. The program storage area may store an operating system, an application required by at least one function (for example, a sound play function or an image display function), and the like. The data storage area may store data (for example, audio data or an address book) or the like created based on use of a mobile phone. In addition, the memory 509 may include a high-speed random access memory, and may further include a nonvolatile memory, for example, at least one magnetic disk storage device, a flash storage device, or another volatile solid-state storage device.

The processor 510 is a control center of the terminal, and connects all parts of the entire terminal by using various interfaces and lines. By running or executing a software program and/or a module stored in the memory 509 and invoking data stored in the memory 509, the processor performs various functions of the terminal and data processing, to perform overall monitoring on the terminal. The processor 510 may include one or more processing units. For example, the processor 510 may be integrated with an application processor and a modem processor. The application processor mainly processes an operating system, a user interface, an application program, and the like. The modem processor mainly processes wireless communication. It can be understood that, in some embodiments, the modem processor may not be integrated into the processor 510.

The terminal 500 may further include a power supply 511 (such as a battery) that supplies power to each component. For example, the power supply 511 may be logically connected to the processor 510 by using a power management system, to implement functions such as charging, discharging, and power consumption management by using the power management system.

In addition, the terminal 500 includes some function nodules not shown, and details are not described herein.

Figure 7:
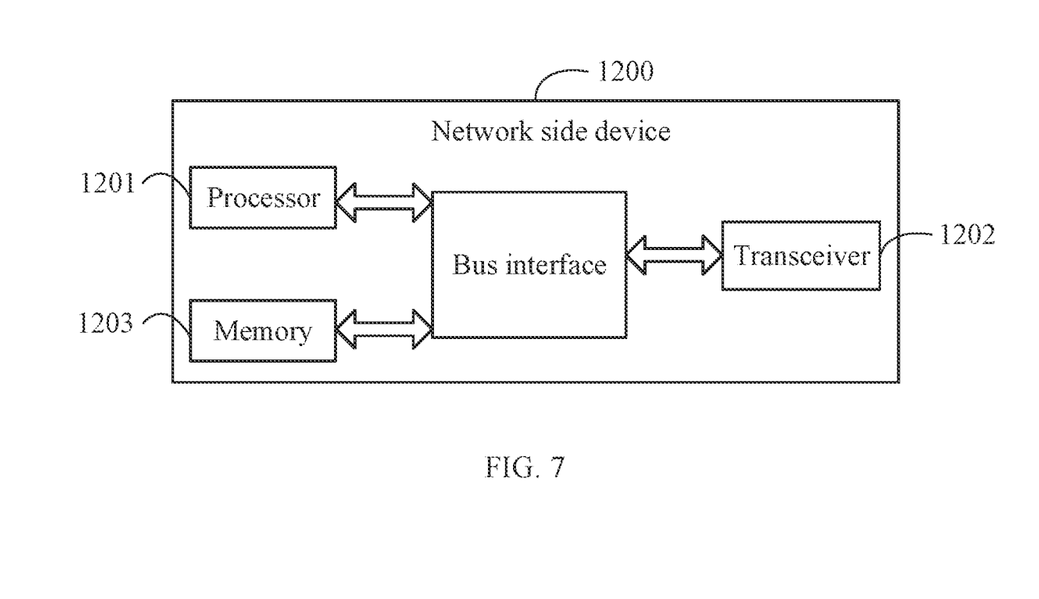
FIG. 7 is a second schematic structural diagram of a network side device according to an embodiment of the present disclosure.

FIG. 7 is a structural diagram of a network side device according to an embodiment of the present disclosure. Details of the foregoing HARQ-ACK feedback mode determining method or the foregoing HARQ-ACK feedback mode configuration method can be implemented, and a same effect can be achieved. As shown in FIG. 7, a network side device 1200 includes a processor 1201, a transceiver 1202, a memory 1203, and a bus interface.

When the communication device is a network side device, the processor 1201 is configured to read a program in the memory 1203, to perform the following processes:

determining, according to a service type corresponding to a PDSCH, a HARQ-ACK feedback mode corresponding to the PDSCH;
  or
  determining, according to a RNTI of a PDSCH, a HARQ-ACK feedback mode corresponding to the PDSCH;
  or
  determining, according to DCI for scheduling a PDSCH, a HARQ-ACK feedback mode corresponding to the PDSCH.

In some embodiments, the processor 1201 is configured to read a program in the memory 1203, to perform the following process:

configuring a corresponding HARQ-ACK feedback mode or a PDSCH corresponding to each service type;
  or
  configuring a corresponding HARQ-ACK feedback mode for each RNTI scrambling a PDSCH;
  or
  indicating a HARQ-ACK feedback mode of a PDSCH by DCI for scheduling the PDSCH.

In conclusion, in the embodiments of the present disclosure, the network side device configures the corresponding HARQ-ACK feedback mode for each service type or each RNTI scrambling a or the network side device indicates the HARQ-ACK feedback mode of the PDSCH through DCI, so that different services with different requirements are configured with different HARQ-ACK feedback modes, which improves system efficiency and can effectively reduce uplink feedback overheads.

It should be noted that the network side device provided in this embodiment of the present disclosure is a network side device capable of performing the HARQ-ACK feedback mode determining method, all embodiments of the HARQ-ACK feedback mode determining method are applicable to the network side device, and a same or similar beneficial effect can be achieved.

In some embodiments, the network side device provided in this embodiment of the present disclosure is a network side device capable of performing the HARQ-ACK feedback mode configuration method, all embodiments of the HARQ-ACK feedback mode configuration method are applicable to the network side device, and a same or similar beneficial effect can be achieved.

In FIG. 7, a bus architecture may include any quantity of interconnected buses and bridges, which are specifically connected together by various circuits of one or more processors represented by the processor 1201 and a memory represented by the memory 1203. The bus architecture may further link various other circuits such as a peripheral device, a voltage regulator, and a power management circuit together. These are all well-known in the art, and therefore are not further described in this specification. The bus interface provides interfaces. The transceiver 1202 may be a plurality of elements, in other words, includes a transmitter and a receiver, and provides a unit configured to communicate with various other apparatuses on a transmission medium.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without more restrictions, an element defined by the statement "including a . . . " does not exclude another same element in this process, method, article, or apparatus that includes the element.

Based on the descriptions of the foregoing implementation manners, a person skilled in the art may clearly understand that the foregoing method embodiments may be implemented by software in addition to a necessary universal hardware platform or by hardware only. In most circumstances, the former is a preferred implementation manner. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the objective of the present disclosure and the protection scope of claims, all of which fall within the protection of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A Hybrid Automatic Repeat reQuest ACKnowledgment (HARQ-ACK) feedback mode determining method, performed by a communication device, comprising:
   determining, according to a Radio Network Temporary Identifier (RNTI) of a PDSCH and Downlink Control Information (DCI) for scheduling the PDSCH, a HARQ-ACK feedback mode corresponding to the PDSCH;
   wherein the HARQ-ACK feedback mode comprises:
   a first mode: no HARQ-ACK feedback; and
   a second mode: HARQ-ACK feedback.

2. The method according to claim 1, wherein the determining, according to DCI for scheduling the PDSCH, a HARQ-ACK feedback mode corresponding to the PDSCH comprises at least one of the following:
   determining, according to a first indicator field carried by the DCI, the HARQ-ACK feedback mode of the PDSCH that is indicated by the first indicator field;
   determining, according to a control resource set of the DCI, the HARQ-ACK feedback mode corresponding to the PDSCH;
   determining, according to a search space of the DCI, the HARQ-ACK feedback mode corresponding to the PDSCH;
   determining, according to a format of the DCI, the HARQ-ACK feedback mode corresponding to the PDSCH; or
   determining, according to a Cyclic Redundancy Check (CRC) RNTI scrambling the DCI, the HARQ-ACK feedback mode corresponding to the PDSCH.

3. The method according to claim 1, wherein the HARQ-ACK feedback mode further comprises at least one of the following:
   a third mode: HARQ-ACK feedback triggered by a network side device;
   a fourth mode: periodic HARQ-ACK feedback; or
   a fifth mode: HARQ-ACK feedback based on link measurement.

4. The method according to claim 1, wherein the HARQ-ACK feedback comprises: negative acknowledgment only feedback, or acknowledgment or negative acknowledgment feedback.

5. The method according to claim 3, wherein the HARQ-ACK feedback based on link measurement comprises:
   when a link measurement result meets a target threshold requirement, triggering HARQ-ACK feedback.

6. The method according to claim 1, wherein
   when determining that the HARQ-ACK feedback mode is the second mode, and when the terminal is configured with multiple PUCCH resources, the terminal determines one of the PUCCH resources based on a number of bits of a HARQ-ACK to be fed back, wherein the PUCCH resource is configured to transmit the HARQ-ACK.

7. A Hybrid Automatic Repeat reQuest ACKnowledgment (HARQ-ACK) feedback mode configuration method, performed by a network side device, comprising:
   configuring a corresponding HARQ-ACK feedback mode for each Radio Network Temporary Identifier (RNTI) scrambling a PDSCH; and
   indicating the HARQ-ACK feedback mode of the PDSCH by Downlink Control Information (DCI) for scheduling the PDSCH,
   wherein the HARQ-ACK feedback mode comprises:
   a first mode: no HARQ-ACK feedback; and
   a second mode: HARQ-ACK feedback.

8. The method according to claim 7, wherein the indicating the HARQ-ACK feedback mode of the PDSCH by DCI for scheduling the PDSCH comprises at least one of the following:
   indicating the HARQ-ACK feedback mode through a first indicator field carried by the DCI;
   indicating, through a control resource set of the DCI, the HARQ-ACK feedback mode corresponding to the PDSCH;
   indicating, through a search space of the DCI, the HARQ-ACK feedback mode corresponding to the PDSCH;
   indicating, according to a format of the DCI, the HARQ-ACK feedback mode corresponding to the PDSCH, or
   indicating, through a Cyclic Redundancy Check (CRC) RNTI scrambling the DCI, the HARQ-ACK feedback mode corresponding to the PDSCH.

9. The method according to claim 7, wherein the HARQ-ACK feedback mode further comprises at least one of the following:
   a third mode: HARQ-ACK feedback triggered by a network side device;
   a fourth mode: periodic HARQ-ACK feedback; or
   a fifth mode: HARQ-ACK feedback based on link measurement.

10. The method according to claim 7, wherein the HARQ-ACK feedback comprises: negative acknowledgment only feedback, or acknowledgment or negative acknowledgment feedback.

11. The method according to claim 9, wherein the HARQ-ACK feedback based on link measurement comprises:
    when a link measurement result meets a target threshold requirement, triggering HARQ-ACK feedback.

12. A communication device, comprising:
    a memory storing computer-readable instructions; and
    a processor coupled to the memory and configured to execute the computer-readable instructions, wherein the computer-readable instructions, when executed by the processor, cause the processor to perform operations comprising:
  determining, according to a Radio Network Temporary Identifier (RNTI) of a PDSCH and Downlink Control Information (DCI) for scheduling the PDSCH, a HARQ-ACK feedback mode corresponding to the PDSCH,
  wherein the HARQ-ACK feedback mode comprises:
  a first mode: no HARQ-ACK feedback; and
  a second mode: HARQ-ACK feedback.

13. The communication device according to claim 12, wherein the determining, according to DCI for scheduling the PDSCH, a HARQ-ACK feedback mode corresponding to the PDSCH comprises at least one of the following:
  determining, according to a first indicator field carried by the DCI, the HARQ-ACK feedback mode of the PDSCH that is indicated by the first indicator field;
  determining, according to a control resource set of the DCI, the HARQ-ACK feedback mode corresponding to the PDSCH;
  determining, according to a search space of the DCI, the HARQ-ACK feedback mode corresponding to the PDSCH;
  determining, according to a format of the DCI, the HARQ-ACK feedback mode corresponding to the PDSCH; or
  determining, according to a Cyclic Redundancy Check (CRC) RNTI scrambling the DCI, the HARQ-ACK feedback mode corresponding to the PDSCH.

14. The communication device according to claim 12, wherein the HARQ-ACK feedback mode further comprises at least one of the following:
  a third mode: HARQ-ACK feedback triggered by a network side device;
  a fourth mode: periodic HARQ-ACK feedback; or
  a fifth mode: HARQ-ACK feedback based on link measurement.

15. The communication device according to claim 13, wherein the HARQ-ACK feedback comprises: negative acknowledgment only feedback, or acknowledgment or negative acknowledgment feedback.

16. The communication device according to claim 14, wherein the HARQ-ACK feedback based on link measurement comprises:
  when a link measurement result meets a target threshold requirement, triggering HARQ-ACK feedback.

17. A network side device, comprising:
  a processor, a memory, and a computer program stored in the memory and executable on the processor, wherein the computer program, when executed by the processor, implements the steps of the HARQ-ACK feedback mode configuration method according to claim 7.

* * * * *